US007477876B2

(12) United States Patent
Das et al.

(10) Patent No.: US 7,477,876 B2
(45) Date of Patent: Jan. 13, 2009

(54) VARIABLE RATE CHANNEL QUALITY FEEDBACK IN A WIRELESS COMMUNICATION SYSTEM

(75) Inventors: Amab Das, Old Bridge, NJ (US); Farooq Ullah Khan, Manalapan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1344 days.

(21) Appl. No.: 10/002,746

(22) Filed: Nov. 2, 2001

(65) Prior Publication Data

US 2003/0087605 A1 May 8, 2003

(51) Int. Cl.
*H04B 17/02* (2006.01)

(52) U.S. Cl. .............. 455/67.13; 455/67.11; 455/250.1; 455/501

(58) Field of Classification Search .............. 455/67.11, 455/67.13, 522, 550.1, 95, 575, 115.1, 127.1, 455/452.1, 452.2, 437, 436, 502–503, 438, 455/432, 450, 442, 358; 370/331, 392; 375/225, 375/222, 240

See application file for complete search history.

(56) References Cited

U.S. PATENT DOCUMENTS

| | | | | |
|---|---|---|---|---|
| 5,778,316 | A * | 7/1998 | Persson et al. | 455/434 |
| 5,995,836 | A * | 11/1999 | Wijk et al. | 455/436 |
| 6,044,272 | A * | 3/2000 | Kobylinski et al. | 455/437 |
| 6,067,458 | A * | 5/2000 | Chen | 455/522 |
| 6,108,374 | A * | 8/2000 | Balachandran et al. | 375/227 |
| 6,154,499 | A * | 11/2000 | Bhaskar et al. | 375/259 |
| 6,324,503 | B1 * | 11/2001 | Manjunath et al. | 704/226 |
| 6,330,462 | B1 * | 12/2001 | Chen | 455/572 |
| 6,760,576 | B2 * | 7/2004 | Chen | 455/266 |
| 2002/0080719 | A1 * | 6/2002 | Parkvall et al. | 370/235 |

FOREIGN PATENT DOCUMENTS

| | | |
|---|---|---|
| EP | 0 938 297 A | 8/1999 |
| WO | WO 99 49610 | 9/1999 |
| WO | WO 00 16513 A | 3/2000 |
| WO | WO 01 22645 A1 | 3/2001 |

OTHER PUBLICATIONS

Naijoh et al, "ARQ Schemes with Adaptive Modulation/TDMA/TDD Systems for WirelessMultimedia Communication Services", Personal, Indoor and Mobile Radio Communications, 1997. Waves of the Year 2000, PIMRC '97, the 8th IEEE International Symposium on Helsinki, Finland Sep. 1-4, 1997, New York, NY, USA, pp. 709-713.

* cited by examiner

*Primary Examiner*—Tony T Nguyen
(74) *Attorney, Agent, or Firm*—Gregory J. Murgia

(57) ABSTRACT

A channel quality feedback method for wireless transmission is described in which the rate for reporting channel quality information from a mobile station to a base station is variable as a function of the presence or absence of a transmission from the base station to the mobile station. In particular, the feedback rate from the mobile station to the base station is increased when the mobile station detects a transmission from the base station. As such, the feedback rate is slower when there is no data transmission for the mobile station and faster when the mobile station is receiving data.

13 Claims, 3 Drawing Sheets

500
BS
600
MS
506
2.0ms
501
NTX (A)
502
NTX (B)
503
NTX (C)
504
NTX (D)
505
RTX (A)
k
l
m
n
p
Fast rate CQ feedback
(e.g. every TTI)
610
611
612
613
614
603
Slow rate CQ feedback
604
Slow rate CQ feedback
0.67ms
601
2.0ms
602

VARIABLE RATE CHANNEL QUALITY FEEDBACK IN A WIRELESS COMMUNICATION SYSTEM

TECHNICAL FIELD

The invention relates generally to wireless communication systems and, more particularly, to providing channel quality information from a mobile station to a base station in such systems.

BACKGROUND OF THE INVENTION

In wireless communication systems, an air interface is used for the exchange of information between a mobile station and a base station or other communication system equipment. The air interface typically comprises a plurality of communication channels. In wireless transmission, a channel is time varying due to fading, mobility, and so on. More specifically, channel quality is affected by factors such as distance between the mobile and base station, speed of the mobile station, interference, and the like. Given the limited resources (e.g., bandwidth) of wireless transmission as well as the large number of mobile stations supported by a base station at any given time and therefore competing for those limited resources, it is therefore important to maximize throughput of a wireless communication system. For example, in a time-multiplexed system in which the transmission time interval spans one or more time slots, system throughput can be maximized by allowing a user with the best channel quality to transmit ahead of users with comparatively low channel quality.

In one known arrangement, a mobile station performs a rate calculation based on measurements of a pilot signal from the base station once every time slot and then reports back the rate at which it is going to receive data from the base station. Alternatively, the mobile station can send channel quality feedback information to the base station and the base station can then select the appropriate rate corresponding to that channel quality. In general, the purpose of sending channel quality feedback information from the mobile station to the base station is to inform the base station of the transmission rate that best matches the current conditions (e.g., quality) of the channel at that present time.

FIG. 1 shows one example of wireless transmission based on the well-known 1x-EV-DO (data only) standard in which a so-called fast rate adaptation scheme is used to maximize the system throughput by exploiting the time varying channel conditions. More specifically, FIG. 1 shows a signaling diagram between a base station (BS) and a mobile station (MS). The data channel 100 for the downlink from the base station to the mobile station is divided into time slots 101-117, each of which has a duration $\tau$. In the case of the 1x-EV-DO standard, the duration $\tau$ would be 1.67 milliseconds. In the example shown in FIG. 1, time slots 101-106 and 110-115 are not carrying transmissions from the base station to the mobile station. However, the base station is transmitting to the mobile station during time slots 107-109 and during time slots 116-117.

From the perspective of the mobile station, the uplink channel 200 is also divided into time slots 201-217, each of which has a duration $\tau$. As shown in FIG. 1, the calculation and reporting of the rate for the dedicated control channel 200 by the mobile station is performed according to well-known methods once every time slot 201-217. More specifically, channel quality information (e.g., transmission rate in 1x-EV-DO systems) is transmitted via communications 151-165. For example, mobile station is transmitting channel quality information to the base station via communications 151-153 during time slots 201-203 indicating that rate R1 is the desired rate of transmission based on the channel quality. As shown in this example, this rate information is received at the base station during time slots 103-105, so there is some delay with respect to the calculation of the rate in the mobile station during a time slot and the subsequent reporting of that rate to the base station. In slot 204, the mobile station detected a change in channel quality and reported back to the base station that transmission should occur at rate R2. This channel quality feedback is received by the base station during its time slot 106. Because the base station is sending a transmission to the mobile station during time slots 107-109 and because the base station is receiving channel quality feedback indicating rate R2 as the desired rate (e.g., R2 reported by mobile station during its time slots 204-206 and received by the base station during its time slots 106-108), the transmission by the base station during time slots 107-109 is therefore sent at rate R2. In time slots 207-212, the mobile station is reporting rate R1 as the desired rate, but no transmissions are occurring from the base station during time slots 110-115. As shown, the mobile station reports rate R3 as the desired rate during time slots 213-216, which are received at the base station starting at time slot 115. Because the base station starts sending another transmission during time slot 116, this transmission therefore is sent at rate R3 based on the channel quality feedback received from the mobile station.

Another approach to providing rate feedback is described in U.S. patent application Ser. No. 09/716,106, entitled "Asymmetric Rate Feedback and Adjustment System for Wireless Communications" and filed on Nov. 17, 2000, the subject matter of which is incorporated herein by reference in its entirety. As described, rate calculation and prediction is still being performed at every time slot, but the reporting of this rate feedback from a mobile station to the base station occurs every third time slot. In this manner, the reporting of rate feedback from a plurality of mobile stations can be staggered such that each mobile station is only sending rate feedback every third time slot, but the base station is receiving rate feedback at each time slot (i.e., from different mobile stations).

There are several disadvantages to these constant rate feedback approaches. Performing rate calculation and prediction in every time slot uses up a large amount of processing overhead at the mobile station. Providing rate feedback to the base station at every time slot uses a large amount of transmission overhead and, because rate feedback is being provided regardless of whether there is a transmission being sent from the base station, transmission resources are therefore being inefficiently used. Even if rate feedback is provided at a slower rate (e.g., every third time slot), there is still inefficient use of resources because the rate feedback is being provided regardless of whether the base station is transmitting.

SUMMARY OF THE INVENTION

Processing overhead for rate calculation/prediction and transmission overhead for rate feedback is substantially reduced for wireless transmissions according to the principles of the invention by varying the feedback rate for reporting channel quality information from a mobile station to a base station as a function of the presence or absence of a transmission from the base station to the mobile station. More specifically, channel quality feedback is provided from the mobile station to the base station at a variable rate such that the feedback rate is faster when the base station is transmitting to the mobile station and slower when there is no transmission occurring.

Wireless resources can be more efficiently used since the rate at which the mobile station reports channel quality to the base station is varied as a function of the absence or presence of transmission from the base station. When the base station is not transmitting to the mobile station, the feedback rate for reporting channel quality from the mobile station is at a slower rate, which, in turn, frees up wireless resources that can be used for other purposes, e.g., for transmissions between the mobile station and the base station. When the base station is transmitting to the mobile station, the rate of reporting channel quality from the mobile station is increased so that rate adaptation can be carried out more accurately by the base station. Moreover, because of the short duration of time slots in wireless transmission, it is highly unlikely that the rate or channel quality will change over a period of a few time slots under most operating conditions.

BRIEF DESCRIPTION OF THE DRAWING

A more complete understanding of the present invention may be obtained from consideration of the following detailed description of the invention in conjunction with the drawing, with like elements referenced with like reference numerals, in which.

DETAILED DESCRIPTION

Figure 2:
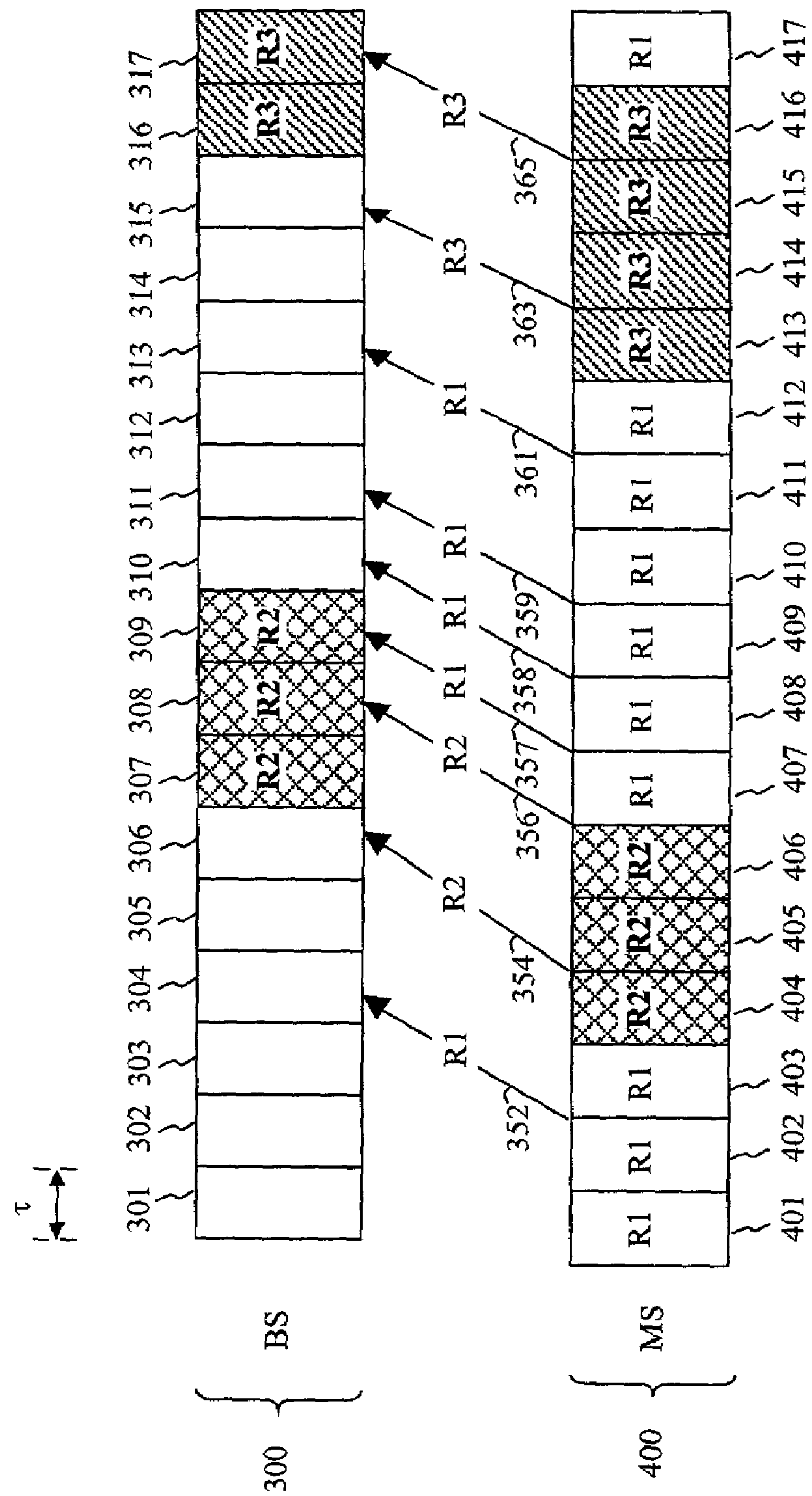
FIG. 2 shows a simplified block diagram of a channel quality feedback and rate adaptation scheme according to one exemplary embodiment of the invention.

FIG. 2 shows one exemplary embodiment for providing variable rate channel quality feedback according to the principles of the invention. By way of example only, this scheme will be described in the context of wireless transmission according to the 1x-EV-DO (data only) standard, but the teachings set forth herein are not at all limited to just this particular wireless implementation.

Figure 1:
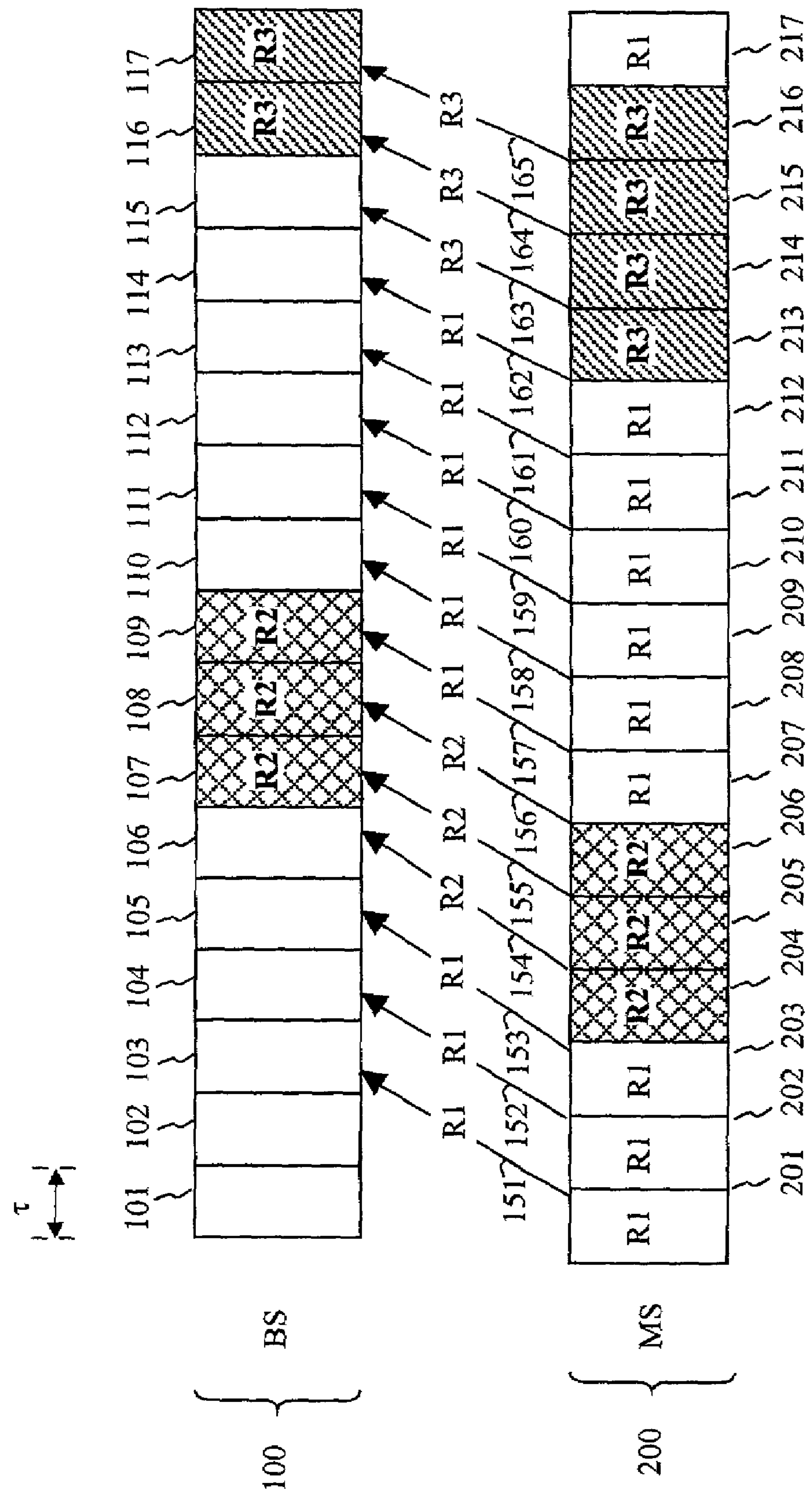
FIG. 1 shows a simplified block diagram of a typical channel quality feedback and rate adaptation scheme in one prior art arrangement.

More specifically, FIG. 1 shows a signaling diagram between a base station (BS) and a mobile station (MS). The data channel 300 for the downlink from the base station to the mobile station is divided into time slots 301-317, each of which has a duration $\tau$, e.g., 1.67 milliseconds. In the example shown in FIG. 2, time slots 301-306 and 310-315 are not carrying transmissions from the base station to the mobile station. However, the base station is transmitting to the mobile station during time slots 307-309 and during time slots 316-317. From the perspective of the mobile station, the uplink control channel 400 is also divided into corresponding time slots 401-417, each of which has a duration $\tau$.

As shown in FIG. 2, the calculation and reporting of the rate for the dedicated control channel 400 by the mobile station is performed using a variable rate in contrast to the prior art methods. In general, when there is no data transmission from the base station (e.g., time slots 301-306), the channel quality information (e.g., rate information) is sent from the mobile station every two (2) slots as shown by communications 352, 354, 361, 363, and 365. As previously described, there is a delay factor with respect to the uplink transmission (from the mobile station) and the downlink transmission (from the base station). When the mobile station is receiving a transmission over the forward link (e.g., downlink from the base station), the channel quality feedback is sent every slot as shown by communications 356-359. As such, the rate at which channel quality feedback is provided when there is a transmission from the base station is faster than the rate at which channel quality feedback is provided when there is no transmission from the base station.

More specifically, FIG. 2 depicts the mobile station transmitting channel quality information (e.g., rate information) to the base station via communications 352 at time slot 402 indicating that rate R1 is the desired rate of transmission based on the channel quality. As shown in this example, this rate information is received at the base station during time slot 304 because of the aforementioned delay factor. In slot 404, the mobile station detected a change in channel quality and reported back to the base station that transmission should occur at rate R2. This channel quality feedback is received by the base station during its time slot 306. Because the base station is sending a transmission to the mobile station during time slots 307-309 and because the base station is receiving channel quality feedback indicating rate R2 as the desired rate (e.g., R2 reported by mobile station in time slot 404 and received by the base station in time slot 306), the transmission by the base station during time slots 307-309 is therefore sent at rate R2. Because the base station is now transmitting data to the mobile station during time slots 307-309, the mobile station is adapted to send the channel quality feedback at a faster rate (e.g., every time slot) for the corresponding time slots 407-409, e.g., as shown by communications 357-359. It should be noted that, because transmission did not start until time slot 307 by the base station and because of the delay factor, the channel quality feedback information indicating rate R2 via communication 356 is still being sent at the slower rate (e.g., every two (2) slots). The faster rate of reporting channel quality feedback does not begin until time slots 407-409 at the mobile station which correspond to time slots 307-309 where transmission is occurring from the base station.

When transmission from the base station ends and there is no further transmission, the mobile station resumes its reporting of channel quality information at the slower rate (e.g., every two (2) slots) as shown by communication 361. For example, there is no transmission from the base station in time slot 310, so the next report of rate information from the mobile station is sent at time slot 411, e.g., two time slots after time slot 409, which corresponded to time slot 309 when transmission ended from the base station.

It should be noted that the feedback rate for transmitting the channel quality information and the point in time when the information is reported (e.g., at the leading edge, during, or at the trail edge of the time slot) are all matters of design choice. As such, the example shown in FIG. 2 where the slower first rate is every two (2) slots and the faster second rate is every one (1) slot, and where the channel quality information is sent at the end of the corresponding time slot at the mobile station are all meant to be illustrative and not limiting in any way. However, those skilled in the art will appreciate that a large value for the reporting interval (time between the reports of channel quality from the mobile station) will reduce the channel quality feedback overhead. However, the resulting slower rate channel quality feedback may also result in large errors in channel quality estimates at the base station and performance degradation. Again, these are matters of design choice that are well understood by one skilled in the art.

According to another aspect of the invention, there are numerous implementations for providing rate feedback at a faster rate after detection of a transmission from the base station. For example, upon detection of a transmission from the base station, the mobile station can report channel quality information at a second rate for a prescribed duration after the detection of the transmission. In this manner, the rate feedback may therefore be provided at a faster rate for a period of time even though transmission from the base station has ended. By way of example, a mobile station may report rate feedback every 100 milliseconds in the absence of a transmission. Upon detection of a transmission from the base station, the mobile station can then provide rate feedback every 20 milliseconds for a prescribed period of time regardless of whether transmission ends from the base station. At the end of that prescribed period of time and assuming there is an absence of a transmission, the mobile station would then resume reporting of rate feedback at the first rate of 100 milliseconds (e.g., the slower rate). In yet another example, the mobile station, upon detection of a transmission from the base station, can report channel quality information at a plurality of rates over a prescribed time period after detection of the transmission, wherein the plurality of rates are different than the first rate. More specifically, upon detection of a transmission, the mobile station would begin reporting rate feedback at a second rate that is faster than the first rate for a prescribed time period. At the end of this prescribed time period and assuming there is an absence of a transmission, the mobile station could then report rate feedback at a third rate that is different than the first and second rates, and so on. Other variations will also be apparent to those skilled in the art and are contemplated by the teachings herein.

On the downlink transmission from the base station, the total capacity is shared by a large number of mobile stations. Due to the bursty nature of the data traffic, the mobile stations are active only a fraction of the time. Therefore, an increased rate of channel quality feedback during the time of data transmission for a given mobile station will not result in any significant increase of overhead. The fast channel quality feedback rate during a transmission from the base station will result in better channel quality estimates that will be used for appropriate selection of transport format for new transmissions and retransmissions. Note that due to the bursty nature of the traffic, when a transmission is sent to a mobile station, it is likely that more transmissions or retransmissions will occur to the same mobile station within a short period of time.

According to another aspect of the invention, the increased feedback rate during data transmission also helps to estimate the quality of a transmission so that, in case of retransmissions, the appropriate amount of redundancy or repetition can be included in the retransmissions. This aspect of the invention is advantageous since it is possible that a transmission might initially start from the base station with a less accurate transmission rate (e.g., not matching up to the actual, current channel quality) since a slower feedback rate is being used before transmission commences. So, although rate adaptation will be accurately performed once the feedback rate increases (e.g., to every time slot), there may be initial portions of the transmission that will require retransmission under certain circumstances. As such, the ability to estimate the quality of the transmission in the current feedback scheme will be helpful for the retransmission process. For example, these estimates can be used for selecting an appropriate transport format (e.g., modulation, number of codes, etc.) for retransmissions for the corresponding previous transmissions.

Figure 3:
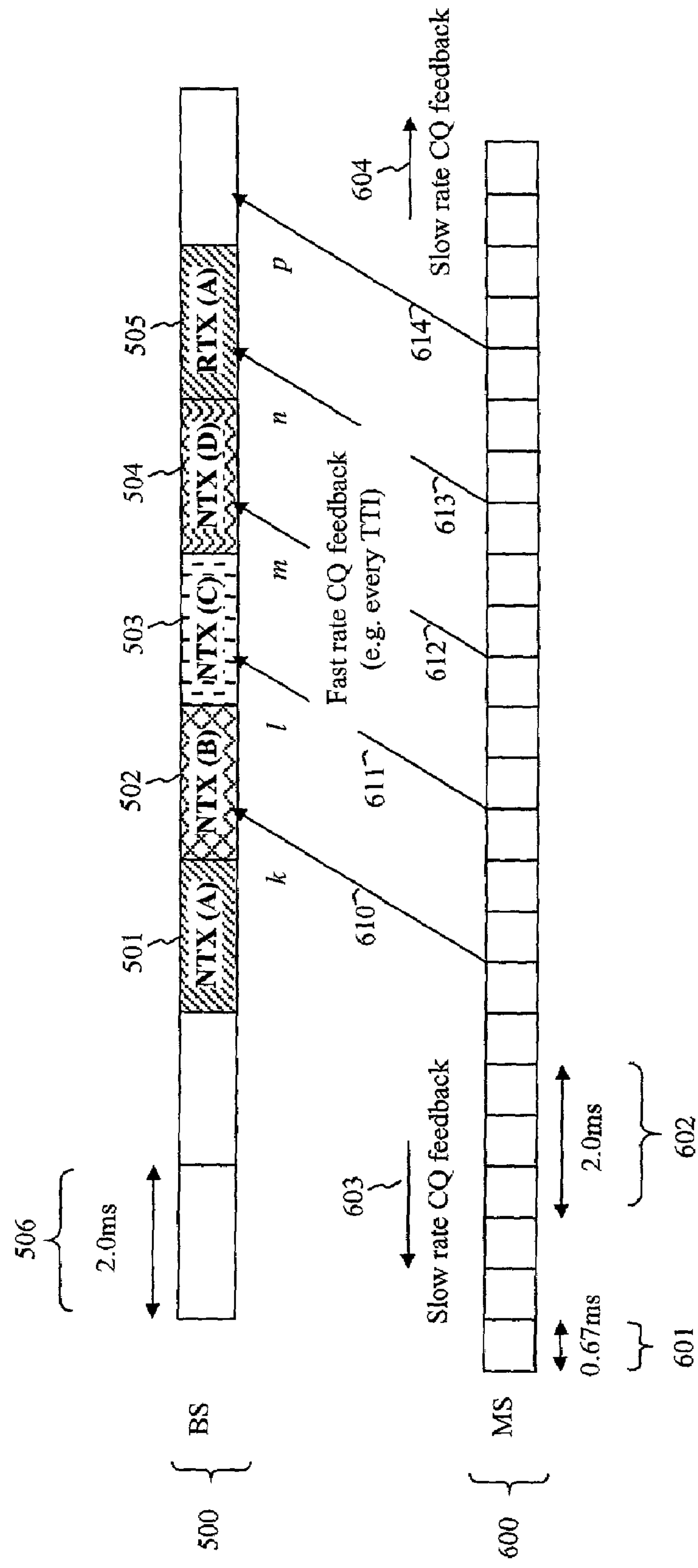
FIG. 3 shows a simplified block diagram of a channel quality feedback and rate adaptation scheme according to another exemplary embodiment of the invention.

The embodiment shown in FIG. 3 helps to illustrate this aspect of the invention. Data channel 500 represents the downlink (forward link) from the base station to the mobile station and is shown as comprising two (2) millisecond frames or transmission time intervals (TTIs) 506. More specifically, data channel 500 shows multiple transmissions for the same user in data blocks 501-505, wherein data blocks 501-504 contain new transmissions while data block 505 contains a retransmission corresponding to the transmission in data block 501. As in the preceding embodiments, control channel 600 represents the uplink (reverse link) from the mobile station. The example shown in FIG. 3 depicts two (2) millisecond transmission time intervals 602, each of which comprises three (3) time slots 601 of 0.67 milliseconds each. This format is characteristic of the aforementioned HSDPA standard.

As in the preceding embodiments, the feedback rate for channel quality information from the mobile station is at a slower rate when there is no data transmission, e.g., as shown for time periods 603 and 604. However, when the mobile station detects transmission from the base station, the channel quality feedback rate is increased to once every transmission time interval (TTI), e.g., two (2) milliseconds, as shown by communications 610-614. In this example, the transport format for the retransmission 505 for data block A (RTX A) can be based on the most recent channel quality feedback (i.e. m) as well as the channel quality estimates k and l that, in turn, provide an estimate of the quality of the previous transmission 501 of data block A (NTX A). Accordingly, the appropriate rate, modulation, and coding scheme can be derived more accurately for the retransmission according to the principles of the invention.

In another exemplary embodiment of the invention, the feedback rate for channel quality information from the mobile station is varied as a function of the number of base stations that the mobile station is communicating with. In particular, this embodiment is particularly advantageous when handling so-called "soft handoffs" in CDMA wireless communication systems. As is well known, a "handoff" is the act of transferring support of a mobile station from one base station to another base station. A "soft handoff" occurs when the mobile station makes a connection to a new base station (e.g., cell) before leaving the current base station (e.g., cell) that is supporting the mobile station. In particular, a "soft handoff" is designed to ensure that there is connectivity with the old (e.g., current) base station while the new base station has been assigned to take control over the communication link with the mobile station. As such, a mobile station may be simultaneously communicating with multiple base stations at a given instant of time during such handoffs. According to the principles of the invention, the feedback rate for reporting channel quality information is adapted or otherwise varied to be slower when the mobile station is communicating with only one base station and faster during a "soft handoff" when the mobile station is communicating with two or more base stations. By increasing the rate of reporting quality information during "soft handoffs, the base stations can effectively and accurately perform the appropriate rate adaptations during such critical times such as "soft handoffs" and the like. It should be noted that other variations to this aspect of the invention will be apparent to those skilled in the art and are therefore contemplated by the teachings herein.

In general, the foregoing embodiments are merely illustrative of the principles of the invention. Those skilled in the art will be able to devise numerous arrangements, which, although not explicitly shown or described herein, nevertheless embody those principles that are within the scope of the invention. For example, although the invention was described in the context of wireless transmission according to the CDMA2000 1x-EV-DO standard, the invention could also be applicable to other known or to-be-developed wireless transmission standards. For example, the teachings of the invention may be applied to wireless transmission according to the well-known High Speed Downlink Packet Access (HSDPA) specification in the Universal Mobile Telecommunication System (UMTS) standard. Other modifications or substitutions will be apparent to those skilled in the art and are contemplated by the teachings herein. Accordingly, the embodiments shown and described herein are only meant to be illustrative and not limiting in any manner. The scope of the invention is limited only by the claims appended hereto.

We claim:

1. A method for transmitting channel quality information in a wireless communication system comprising at least one base station and at least one mobile station, the method comprising:

varying a rate for reporting channel quality information from a mobile station to a base station as a function of the presence or absence of a reception of a data transmission at the mobile station, wherein the mobile station reports channel quality information at a first rate in the absence of a reception of a data transmission from the base station and, upon detection of a reception of a data transmission from the base station, the mobile station reports channel quality information at a second rate for a prescribed duration.

2. The method according to claim 1, wherein, upon detection of a reception of a data transmission from the base station, the mobile station reports channel quality information at a plurality of rates over a prescribed time period after detection of the reception of a data transmission, wherein the plurality of rates are different than the first rate.

3. The method according to claim 2, wherein the prescribed time period includes a plurality of time intervals such that the channel quality information is reported at different ones of the plurality of rates during different ones of the plurality of time intervals.

4. The method according to claim 1, wherein the second rate is faster than the first rate.

5. The method according to claim 1, further comprising the step of estimating channel quality at the base station while the mobile station is reporting at the second rate, wherein estimated channel quality is used to derive a transmission format for a subsequent transmission.

6. The method according to claim 5, wherein the transmission format includes one or more parameters selected from the group consisting of modulation format, number of codes, and transmission rate.

7. The method according to claim 1, further comprising the step of estimating channel quality at the base station while the mobile station is reporting at the second rate, wherein estimated channel quality is used to calculate an amount of redundancy needed for a retransmission of a previous data transmission.

8. The method according to claim 1, wherein the channel quality information comprises a transmission rate calculated by the mobile station based on one or more channel conditions.

9. A method for adapting the rate of reporting channel quality information in a wireless communication system including at least one base station and at least one mobile station, the method comprising:

reporting channel quality information from the at least one mobile station to the at least one base station at a first rate in the absence of a reception of a data transmission at the at least one mobile station; and in the presence of a reception of a data transmission at the at least one mobile station, adapting the rate for reporting channel quality information from the at least one mobile station to the at least one base station from the first rate to a second rate for a prescribed duration.

10. The method according to claim 9, wherein the second rate is faster than the first rate.

11. A method for transmitting channel quality information in a wireless communication system including at least one base station and at least one mobile station, the method comprising:

varying a rate for reporting channel quality information from a mobile station to a base station as a function of the number of base stations with which the mobile station is communicating.

12. The method according to claim 11, wherein the mobile station reports channel quality information at a first rate when the mobile station is communicating with one base station and wherein the mobile station reports channel quality information at a second rate when the mobile station is communicating with a plurality of base stations.

13. The method according to claim 12 wherein the second rate is faster than the first rate.

* * * * *